Dec. 10, 1963  A. R. NORDEN  3,113,820
INSULATED BUS BAR ASSEMBLY
Filed Oct. 16, 1961  2 Sheets-Sheet 1

INVENTOR.
ALEXANDER R NORDEN
BY
ATTORNEY

Dec. 10, 1963  A. R. NORDEN  3,113,820
INSULATED BUS BAR ASSEMBLY
Filed Oct. 16, 1961  2 Sheets-Sheet 2
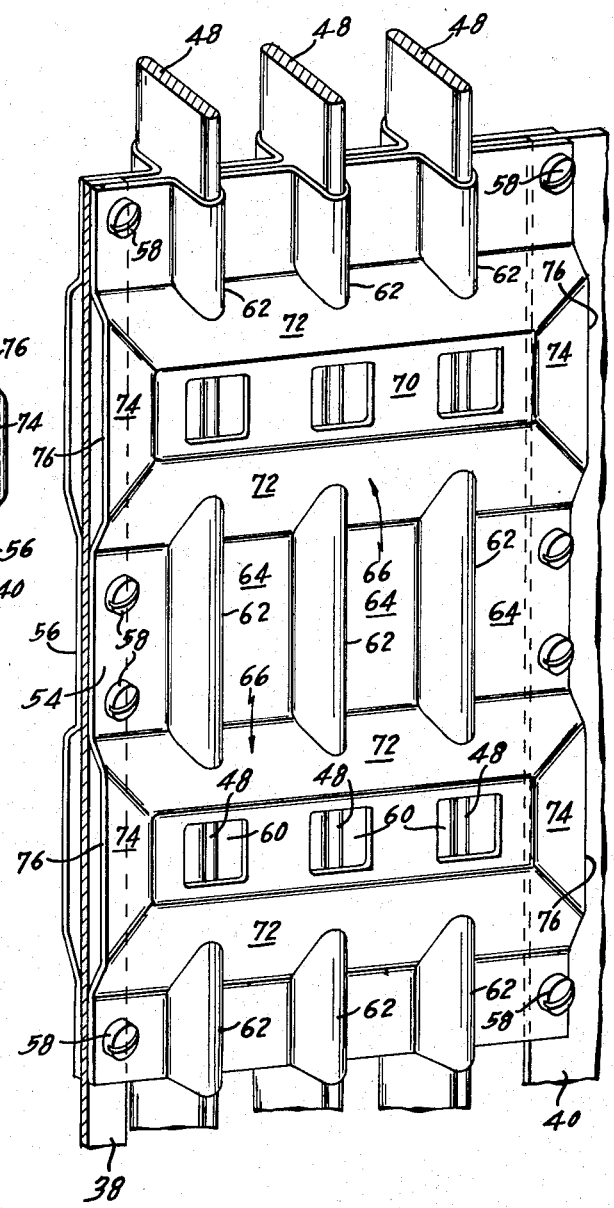
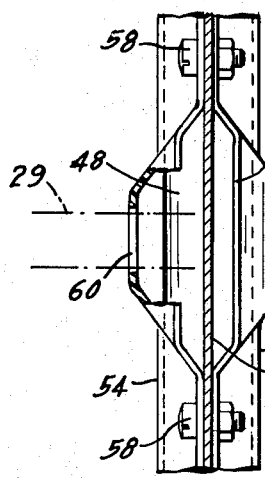
INVENTOR.
ALEXANDER R. NORDEN
BY
ATTORNEY United States Patent Office 3,113,820
Patented Dec. 10, 1963

3,113,820
INSULATED BUS BAR ASSEMBLY
Alexander R. Norden, New York, N.Y., assignor to Federal Pacific Electric Company, a corporation of Delaware
Filed Oct. 16, 1961, Ser. No. 145,261
13 Claims. (Cl. 339—22)

This invention relates to electrical apparatus and more particularly to bus bar assemblies and insulators, particularly for use with plug-in units.

Bus bar structures generally comprise a plurality of elongated aligned bars, connectable to different phases in a plural phase electrical system, which are insulated from one another and yet held in a fixed relationship by insulating structure. The bus bar structure is especially adapted to be contained within a protective metal enclosure which is provided with cells containing separable control units and for this reason the invention is described in that connection, but the invention has broader application.

Plug-in contacts of the separable plug-in units extend into contact with the bus bars. The bus bars must be rigidly supported to withstand the plugging-in operation as well as the electro-mechanical stresses induced by high currents flowing through the bars. Destructive forces may well develop under short-circuit conditions, tending to distort the bus bars and damage their supporting structure. In many prior devices, insulating supports engage the bus bars only at relatively widely spaced intervals, leaving relatively long unconstrained lengths of bus bars between the points of support for build-up of deforming stresses.

In the application of bus structure to enclosed control apparatus having removable control units, large access openings in the metal enclosure are provided to accommodate plug-in units such as motor starters and the like. These large access openings may create hazardous conditions due to exposure of the bus bars to be engaged by the plug-in units.

Additionally cumbersome structures have been used to support the spaced bus bar insulators within the panelboard enclosure. These structures were expensive, they commonly involved many parts, and they were difficult to assemble.

It is an object of this invention to increase the high current strength of bus structures. Another object of this invention is to provide a panelboard enclosure containing a fully insulated bus structure with a plurality of accessible plug-in areas. Another object of this invention is to reduce the number of parts required in a bus structure.

It is yet another object of this invention to provide a bus structure having improved safety characteristics.

These and other objects and advantages of the invention are achieved in the illustrative embodiment of the invention that is described in detail below and shown in the accompanying drawings. This embodiment includes an assembly of relatively wide and thin bus bars whose wide surfaces are in successive parallel planes. In this configuration the edges of the bus bars are aligned in a pair of parallel planes, and the wide surfaces of the bus bars are properly arranged for wiping pressure engagement by resilient plug-in contacts. The bus bars are firmly supported in this configuration by unitary members of insulation that confront the bus bar edges and extend for a substantial distance along and all the way across the bus bar assembly. The bus bar supports are of generally uniform-thickness rigid insulation that provides longitudinal grooves receiving the bus bars edgewise, thus constituting longitudinal corrugations interconnected by integral insulating structure extending between the bus bars perpendicular to the broad faces of the bus bars. Transverse or cross corrugations have access openings opposite the edges of the bus bars and in line with the longitudinal corrugations to admit plug-in contacts while minimizing the possibility of accidental contact with the bus bars.

For a better understanding of the illustrative embodiment of the invention and the novel features thereof as well as further objects and advantages of the invention, reference is made to the following description taken in conjunction with the accompanying drawings in which:

FIG. 4 is a perspective view of the bus structure of FIG. 1 removed from the enclosure and with some portions broken away and other portions in sections; and FIG. 5 is a side view of the structure of FIG. 2 viewed along the plane 5—5 therein.

Figure 1:
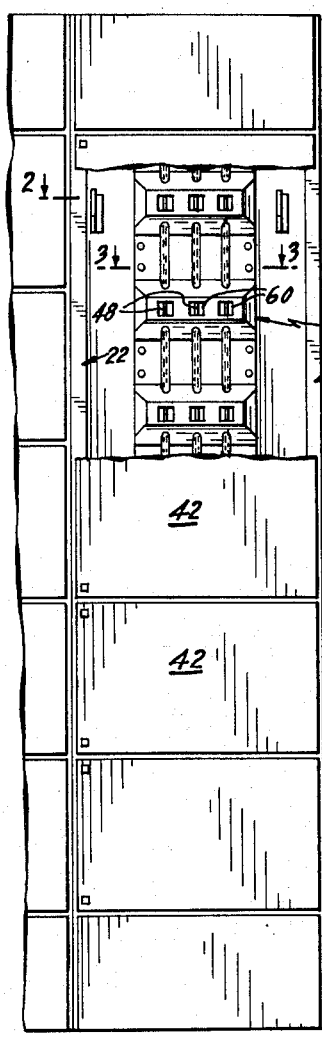
FIG. 1 is a front view of a panelboard structure with some portions omitted and other portions broken away in the interests of simplicity and clarity.
Figure 2:
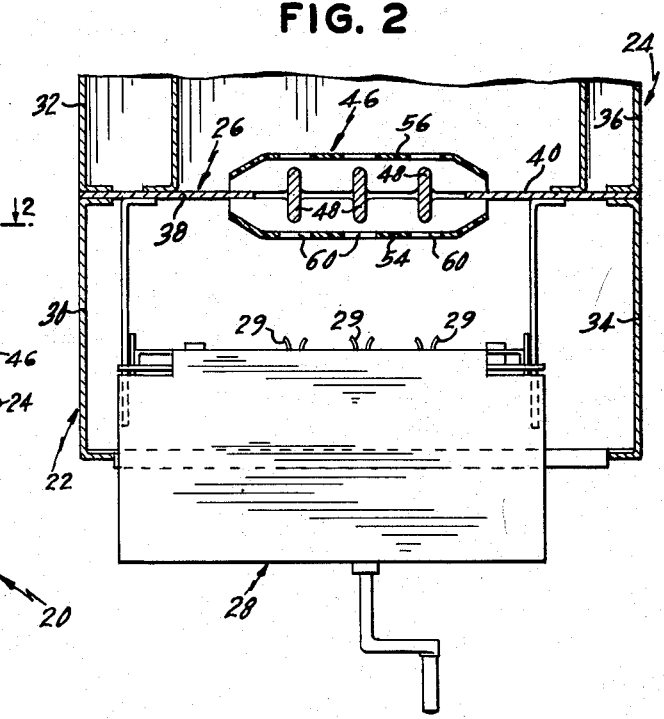
FIG. 2 is a plan view in section taken along the plane 2—2 of FIG. 1.

Referring to the drawings, the illustrative embodiment of the invention includes a panelboard structure comprising an enclosure 20 having opposed sidewalls 22, 24 and an intermediate wall 26 spanning the sidewalls. The sidewalls define an opening for receiving a separable control unit 28, having plug-in contacts 29, and are built up from channel members 30, 32, 34, 36 respectively. Each such channel member has opposed flanges. The channel members 30, 32 forming sidewall 22 are secured together by their adjacent flanges with panel member 38, a portion of the intermediate wall 26, interposed. Sidewall 24 is similarly constructed with panel member 40 interposed between the adjacent flanges of channels 34, 36. Compartment doors 42 are hinged at 44 on the free flange of the channel member and are secured to the flange portion of the opposing channel 30 in the closed position overlying the access opening defined by the sidewalls. The panelboard structure 20 and associated separable control unit 28 are described in greater detail in my application Serial No. 145,257 filed concurrently herewith, which is assigned to the same assignee as the present invention.

The intermediate or back wall 26 incorporates the bus structure 46. The bus structure comprises an assembly of relatively wide and thin bus bars 48 each having a broad face 50 and a narrow face 52. The wide faces of the bars are in successive parallel planes. In this configuration the narrow faces of the bars are aligned in a pair of parallel planes. The bars are electrically insulated from one another and from the housing by means of a pair of opposed unitary members of insulation 54, 56 that confront the bus bar edges and extend for a substantial distance along and all the way across the bus bar assembly. The insulators are joined to each other and to the panel members 38, 40 by bolts 58. Each insulator 54, 56 is provided with a plurality of access openings 60 through which the bus bars 48 are accessible to the plug-in contacts 29 of the control unit 28.

Each insulator 54, 56 is fabricated from insulating material having the desired physical and electrical characteristics. Such a material is a relatively rigid polyester resin reinforced with fiber glass and molded to the configuration shown in the drawing. The thickness of the insulator is substantially uniform throughout. The insulator has longitudinal grooves 62 for receiving the bus bars edgewise. The grooves form longitudinal corrugations interconnected by integral insulating structure 64 extending between the bars perpendicular to the broad faces 50 of the bars 48. Transverse or cross-corrugations 66 are provided which are deeper than the longitudinal corrugations 62. The longitudinal corrugations 62 of the illustrative embodiment are of a height less than one-half the width of the broad face 50 of the bus bars 48 with which they are to be employed. Longitudinal corrugations 62 form bus bar receiving pockets for edgewise engagement with the bars 48. In this manner, when the insulators are assembled together the opposed grooves 62, although separated by the thickness of the side panels 38, 40 secure the bars 48 in position (see FIG. 3). The width of the grooves 62 approximates the width of the narrow face 52 of the bus bars 48 for the aforenoted engagement.

The transverse corrugations 64 extend from side to side of the insulator. The flat top surface 70 of the transverse corrugation is higher than the longitudinal corrugations 62 which the transverse corrugation intersects. This spaces the insulator away from the bars 48 beneath the transverse corrugation. Top surface 70 is parallel to the interconnecting structures or flat areas 64 of the insulator. Sloped side portions 72 extend upwardly from the flat areas 64 to the top 70 of the transverse corrugation 66.

The end of the transverse corrugation 66 adjacent the edge of the insulator is beveled, as at 74, toward the plane of the flat areas 64 as shown in the drawings. The lower ends 76 of the corrugation 66 cooperate with the mounting side panels 38, 40 to obstruct access to the bus bars 48 from the side of the structure 46. This adds greatly to the safety of the device employing the subject insulators.

When the insulators 54, 56 are used in connection with panelboard enclosure, as illustrated in the drawings, it is possible to provide a structure which is double sided i.e. one which allows access to the bus bars 48 from both sides of the bus structure 46. In other installations where it is desirable to have access to the bus structure 46 from only one side, then the access openings 60 may be omitted from the insulator sheet on that side of the structure 46. While the structure shown in detail in FIG. 4 illustrates the use of a one-piece insulator sheet 54 on one side of the bus structure 46 it is conceivable that the longitudinal length of the structure would require the use of plural sheets on each side. In that case the ends of the sheets may be over-lapped and bolted together to the side plates supporting them. The material from which the insulator sheets are fabricated has sufficient resilience to allow for the required bending in the over-lapped area without fracturing.

Referring to FIG. 4 the transverse corrugation 66 strengthens the sheet against bending about an axis parallel to the longitudinal axis of the bus structure 46. The longitudinal corrugations 62 prevent bending of the insulator about an axis perpendicular to their longitudinal axis.

Figure 3:
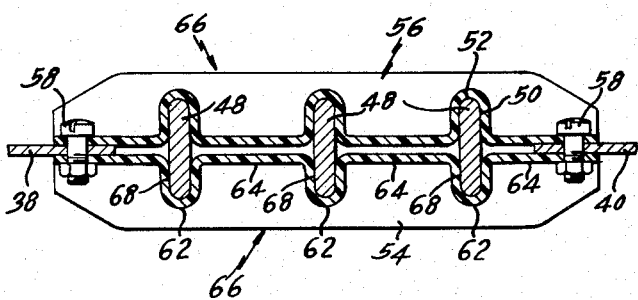
FIG. 3 is a plan view in section on an enlarged scale taken through the plane 3—3 of FIG. 1.

Referring to FIG. 3 it will be seen that the bus bars are separated from one another by the interconnecting areas 64 which act as beam members preventing movement of the bars toward one another. The insulator material is sufficiently rigid to withstand the contemplated short circuit currents and the plug-in thrust induced stresses without fracture or deformation.

By having the top surface 70 of the transverse corrugation 66 spaced away from the bus bars 48, the access to the bus bars through the openings 60 is reduced except in a directly perpendicular direction. It is in this direction that the plug-in stab 29 of the control unit 28 moves to engage the bus bars as shown in phantom in FIG. 5.

The strength of the bus structure 46 is enhanced by the side panels 38, 40 which are perpendicular to the planes defined by broad faces 50 of the bus bars 48 as illustrated in FIGURE 3. The insulators 54, 56 are clamped together and to the side panels 38, 40 by the bolts 58.

The bus structure 46 may be employed in the fabrication of bus duct and the like as well as in the illustrative embodiment herebefore described. The insulators 54, 56 provide a simple, and inexpensive manner for mounting bus bars 48 in a variety of enclosures. While only one embodiment of the invention has been shown and described to be readily apparent to those skilled in the art various changes and modifications may be made therein without departing from the spirit or scope of the invention.

What is claimed is:

1. A bus bar assembly including a group of mutually separated relatively wide and thin bus bars disposed with their wide surfaces in successive parallel planes and with their edges in a pair of parallel planes, and insulating support means for said bus bars including a unitary member of relatively rigid, strong insulation extending across aligned edges of the group of bus bars and along a substantial length thereof, said member being of generally uniform thickness and formed to include longitudinal corrugations providing complementary grooves for receiving the bus bars edgewise, said member of insulation including integral structure extending between and interconnecting said longitudinal corrugations and perpendicular to the broad faces of the bus bars, said insulating support means including at least one transverse corrugation that extends integrally from said interconnecting structure and said longitudinal corrugations, said transverse corrugation being deeper than said longitudinal corrugations so as to project clear of the bus bar edges and having plug-in openings formed therein opposite the edges of the bus bars.

2. A bus bar assembly including a group of mutually separated relatively wide and thin bus bars disposed with their wide surfaces in successive parallel planes and with their edges in a pair of parallel planes, and insulating support means for said bus bars including confronting unitary members of relatively rigid, strong insulation secured together and extending across opposite edges of the group of bus bars and along a substantial length thereof, said members each being of generally uniform thickness and formed to include longitudinal corrugations providing complementary grooves for receiving the bus bars edgewise, each said member of insulation including interconnecting integral insulating structure extending between said longitudinal corrugations and perpendicular to the broad faces of the bus bars, and at least one of said members including at least one transverse corrugation that extends integrally from the interconnecting structure and the longitudinal corrugations of said one member and being deeper than said longitudinal corrugations as to project clear of the bus bar edges and having plug-in openings formed wherein opposite the edges of the bus bars.

3. A bus bar assembly including a group of mutually separated relatively wide and thin bus bars disposed with their wide surfaces in successive parallel planes and with their edges in a pair of parallel planes, and insulating support means for said bus bars including a unitary member of insulation extending across aligned edges of the group of bus bars and along a substantial length thereof, said member being of generally uniform thickness and formed to include longitudinal corrugations providing complementary grooves for receiving the bus bars edgewise, said member of insulation including integral structure extending between and interconnecting said longitudinal corrugations and perpendicular to the broad faces of the bus bars, said insulating support means including a corrugation extending integrally from said interconnecting structure and from said longitudinal corrugations.

4. A bus bar assembly including a group of mutually separated relatively wide and thin bus bars disposed with their wide surfaces in successive parallel planes and with their edges in a pair of parallel planes, and insulating support means for said bus bars including a unitary member of relatively strong, rigid insulation extending across aligned edges of the group of bus bars and along a substantial length thereof, said member being of generally uniform thickness and formed to include longitudinal corrugations providing complementary grooves receiving the bus bars edgewise, said member including cross-corrugations extending between said longitudinal corrugations and integral therewith and perpendicular to the broad faces of the bus bars.

5. A unitary member of insulation for supporting a group of mutually separated relatively wide and thin bus bars disposed with their wide surfaces in successive parallel planes and with their edges in a pair of parallel planes, said member being of generally uniform thickness and formed to include mutually separated corrugations parallel to each other and providing grooves for receiving bus bars edgewise, said member including interconnecting integral insulating structure extending between said longitudinal corrugations and perpendicular to said grooves, said insulating support including a corrugation integral with said longitudinal corrugations and perpendicular thereto and integral with said interconnecting insulating structure.

6. A bus bar assembly including a group of mutually separated relatively wide and thin bus bars disposed with their wide surfaces in successive parallel planes and with their edges in a pair of parallel planes, and insulating support means for said bus bars including a unitary member of relatively strong, rigid insulation extending across aligned edges of the group of bus bars and along a substantial length thereof, said member being of generally uniform thickness and formed to include longitudinal corrugations providing complementary grooves receiving the bus bars edgewise, said member including cross-corrugations extending between said longitudinal corrugations and integral therewith and perpendicular to the broad faces of the bus bars, said cross-corrugations being deeper than said longitudinal corrugations to project away from the plane of the edges of said bars.

7. A bus bar assembly including a group of mutually separated relatively wide and thin bus bars disposed with their wide surfaces in successive parallel planes and with their edges in a pair of parallel planes, and insulating support means for said bus bars including a unitary member of relatively strong, rigid insulation extending across aligned edges of the group of bus bars and along a substantial length thereof, said member being of generally uniform thickness and formed to include longitudinal corrugations providing complementary grooves receiving the bus bars edgewise, said member including cross-corrugations extending between said longitudinal corrugations and integral therewith and perpendicular to the broad faces of the bus bars and rectangular flat portions interconnecting the edges of the longitudinal corrugations and of said cross-corrugations both between said bus bars and extending laterally thereof.

8. A bus structure including a longitudinally extending enclosure having an access opening therein to provide for the insertion and withdrawal of a plug-in unit, a plurality of aligned bus bars within said enclosure, and insulating means supporting said bus bars within said enclosure, said insulating means including an insulator having a plurality of spaced longitudinal corrugations of a given height forming pockets for receiving portions of bus bars therein and a plurality of spaced transverse corrugations of a height greater than said longitudinal corrugations, said insulator having an aperture in a transverse corrugation aligned with one of said longitudinal corrugations for providing access to the bus bar contained therein.

9. A bus structure including a pair of opposed bus bar insulators, each of said insulators of a given thickness and having a greater length than width, a plurality of bus bars each having a broad face and a narrow face, each of said insulators having a plurality of spaced longitudinal corrugations of a height substantially equal to one half the width of the broad face of a bus bar forming a pocket for receiving said bus bar therein between said insulators, a plurality of spaced transverse corrugations of a height greater than said longitudinal corrugations, at least one aperture in one of said transverse corrugations aligned with one of said longitudinal corrugations for providing access to a bus bar contained therein, and means clamping the insulators to one another with said bus bars held therebetween.

10. A bus structure including a longitudinally extending enclosure having opposite sidewalls defining an access opening therein to provide for the insertion and withdrawal of a plug-in unit, an intermediate wall including a plurality of aligned bus bar spanning said sidewalls, each of said bus bars having a broad face and a narrow face, and insulating means supporting said bus bars within said enclosure, said insulating means comprising a pair of opposed insulators, each of said insulators having a plurality of spaced longitudinal corrugations of a height less than one half the width of the broad face of a bus bar forming a pocket for receiving said bus bars therein between oppositely disposed insulators, a plurality of spaced transverse corrugations of a height greater than said longitudinal corrugations, an aperture in a transverse corrugation aligned with one of said longitudinal corrugations for providing access to the bus bar contained therein, and means clamping the insulators to one another with said bus bars therebetween and securing said bus bars to said sidewalls.

11. A bus bar assembly including a group of mutually separated relatively wide and thin bus bars disposed with their wide surfaces in successive parallel planes and with their edges in a pair of parallel planes, insulating support means for said bus bars including a unitary member of relatively rigid, strong insulation extending across aligned edges of the group of bus bars and along a substantial length thereof, said member being of generally uniform thickness and formed to include longitudinal corrugations providing complementary grooves for receiving the bus bars edgewise, said member of insulation including integral structure extending between and interconnecting said longitudinal corrugations and perpendicular to the broad faces of the bus bars, said insulating support means including at least one transverse corrugation that extends integrally from said interconnecting structure and said longitudinal corrugations, said transverse corrugation being deeper than said longitudinal corrugations so as to project clear of the bus bar edges and having plug-in openings formed therein opposite the edges of the bus bars, and side panels for mounting said insulating support means, said panels lying in a plane perpendicular to the planes defined by the wide surfaces of said bars.

12. A bus bar assembly including a group of mutually separated relatively wide and thin bus bars disposed with their wide surfaces in successive parallel planes and with their edges in a pair of parallel planes, insulating support means for said bus bars including a unitary member of relatively strong, rigid insulation extending across aligned edges of the group of bus bars and along a substantial length thereof, said member being of generally uniform thickness and formed to include longitudinal corrugations providing complementary grooves receiving the bus bars edgewise, said member including cross-corrugations extending between said longitudinal corrugations and integral therewith and perpendicular to the broad faces of the bus bars and rectangular flat portions interconnecting the edges of the longitudinal corrugations and of said cross-corrugations both between said bus bars and extending laterally thereof, and side panels for mounting said insulating support means, said panels lying in a plane perpendicular to the planes defined by the wide surfaces of said bars.

13. A unitary member of insulation for supporting a group of mutually separated relatively wide and thin bus bars disposed with their wide surfaces in successive parallel planes and with their edges in a pair of parallel planes as set forth in claim 5, further including means defining openings in said "perpendicular" corrugation and aligned with said mutually separated parallel corrugations for admitting projecting plug-in contacts from one side of the member of insulation to engage bus bars when received in said grooves.

References Cited in the file of this patent

UNITED STATES PATENTS

| | | |
|---|---|---|
| 1,650,706 | Gent | Nov. 29, 1927 |
| 2,939,101 | Johnson | May 31, 1960 |
| 2,963,537 | Carlson et al. | Dec. 6, 1960 |
| 3,018,320 | Rowe | Jan. 23, 1962 |